United States Patent [19]

Mann

[11] Patent Number: 5,717,933
[45] Date of Patent: Feb. 10, 1998

[54] INTERRUPT HANDLING THAT DISABLES INTERRUPTS UPON SAVING THE REGISTERS

[75] Inventor: Daniel P. Mann, Austin, Tex.

[73] Assignee: Advanced Micro Devices, Inc., Sunnyvale, Calif.

[21] Appl. No.: 705,033

[22] Filed: Aug. 29, 1996

Related U.S. Application Data

[63] Continuation of Ser. No. 52,347, Apr. 23, 1993, abandoned.

[51] Int. Cl.⁶ .................................................. G06F 9/46
[52] U.S. Cl. .................................................. 395/735
[58] Field of Search .................................................. 395/735

[56] References Cited

U.S. PATENT DOCUMENTS

| | | | |
|---|---|---|---|
| 5,050,067 | 9/1991 | McLagan et al. | 395/725 |
| 5,161,226 | 11/1992 | Wainer | 395/650 |
| 5,241,680 | 8/1993 | Cole et al. | 395/750 |
| 5,327,566 | 7/1994 | Forsyth | 395/725 |
| 5,349,667 | 9/1994 | Kaneko | 395/725 |
| 5,560,032 | 9/1996 | Nguyen et al. | 395/800 |
| 5,600,823 | 2/1997 | Sherer et al. | 395/500 |

OTHER PUBLICATIONS

Book entitled "RISC Design–Made Easy—Application Guide", 29K, published ©1992 Advanced Micro Devices, Inc.

Book entitles "Am29050™ Microprocessor" User's Manual, published ©1991 Advanced Micro Devices, Inc.

Brochure entitled "Am29000™ and AM29005™ Streamlined Instruction Microprocessors", published ©1992 Advanced Micro Devices, Inc.

*Primary Examiner*—Jack B. Harvey
*Assistant Examiner*—David A. Wiley
*Attorney, Agent, or Firm*—Skjerven, Morrill, MacPherson, Franklin & Friel LLP; Ken J. Koestner

[57] ABSTRACT

To speed up interrupt processing by interrupt handlers executing with interrupts disabled, one or more processor registers in the computer system are reserved for exclusive use by software executing with interrupt disabled. Interrupt processing code can be written in a high level language. If the code generated by the high level language compiler uses non-reserved registers, these registers are saved by the interrupt handler in the reserved registers before the interrupt processing code is invoked. After execution of the interrupt processing code, the interrupt handler restores the non-reserved registers from the reserved registers. Saving the non-reserved registers in the reserved registers rather than in a memory improves the interrupt processing speed.

34 Claims, 3 Drawing Sheets

```
;---------------------------------------------------------------- INTERRUPT CACHE
; Fast way of dealing with Freeze-mode interrupt handlers
; Daniel Mann
 .macro interrupt_cache, trap_number, C_handler, nregs sub     gr1,gr1,4*4         ;get lr0-lr3 space
        asgeu   V_SPILL,gr1,rab     ;check for stack spill
        add     lr1,gr121,0         ;save gr121
        add     lr0,gr96,0          ;save gr96
        const   gr121,290           ;HIF 2.0 SETTRAP service
        const   lr2,trap_number     ;trap number, macro parameter
        const   lr3,$1-(nregs*4)    ;trap handler address
        consth  lr3,$1-(nregs*4)
        asneq   69,gr1,gr1          ;HIF service request
        add     gr121,lr1,0         ;restore gr121
        add     gr96,lr0,0          ;restore gr96
        add     gr1,gr1,4*4         ;restore stack
        jmp     $2                  ;macro code finished
        asleu   V_FILL,lr1,rfb      ;check for stack fill
;
        add     gr80,gr111,0        ;save gr111
        add     gr79,gr110,0
        add     gr78,gr109,0
        add     gr77,gr108,0
        add     gr76,gr107,0
        add     gr75,gr106,0
        add     gr74,gr105,0
        add     gr73,gr104,0
        add     gr72,gr103,0
        add     gr71,gr102,0
        add     gr70,gr101,0
        add     gr69,gr100,0
        add     gr68,gr99,0
        add     gr67,gr98,0
        add     gr66,gr97,0         ;save gr97
        add     gr64,lr0,0          ;save lr0
$1:
;
        const   lr0,C_handler
        consth  lr0,C_handler       140.02
        calli   lr0,lr0
        add     gr65,gr96,0         ;save gr96
;
```

FIG. 2A

```
       jmp    $2-4-(nregs*4)
        add    lr0,gr64,0        ;restore lr0
        add    gr111,gr80,0      ;restore gr111
        add    gr110,gr79,0
        add    gr109,gr78,0
        add    gr108,gr77,0
        add    gr107,gr76,0
        add    gr106,gr75,0
        add    gr105,gr74,0
        add    gr104,gr73,0          }140.3
        add    gr103,gr72,0
        add    gr102,gr71,0
        add    gr101,gr70,0
        add    gr100,gr69,0
        add    gr99,gr68,0
        add    gr98,gr67,0
        add    gr97,gr66,0
        add    gr96,gr65,0       ;restore gr96
       iret  }140.4
$2:
.endm
```

INTERRUPT HANDLING THAT DISABLES INTERRUPTS UPON SAVING THE REGISTERS

This patent is a continuation of U.S. Pat. Ser. No. 08/052,346 filed Apr., 23, 1993, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION
1. Field of the Invention

The present invention relates to computer systems, and more particularly to interrupt handling in computer systems.

2. Description of Related Art

A typical computer system includes a processor which executes software stored in a computer memory. When an interrupt occurs, the processor executes software called an interrupt handler. On occurrence of an interrupt, the computer system hardware and/or the interrupt handler typically save the processor registers which can be destroyed by the interrupt handler because these registers may be needed for the interrupted program. General purpose registers, i.e., registers which can be modified directly by arithmetic and/or logical operations, are saved in the memory.

Before returning to the interrupted program, the interrupt handler and/or the system hardware restore the saved registers.

The register saving increases the interrupt latency defined as the time elapsed between the moment when the system takes an interrupt and the beginning of the execution of the interrupt processing code. The interrupt processing code is that part of the interrupt handler which is not related to register saving and restoration. To increase the system speed, it is desirable to improve the interrupt latency and also to improve (i.e., reduce) the register restoration time at the end of interrupt handling. Improving the interrupt latency and the register restoration time is particularly important for interrupt handlers executed with interrupts disabled because other interrupts may be missed while such an interrupt handler is executing.

Thus, it is desirable to provide interrupt handling techniques with reduced interrupt latency and reduced register restoration time. Because saving and restoring general purpose registers involves a memory access, and because a memory access takes a relatively large amount of time, it is particularly desirable to improve the efficiency of general purpose register handling. Further, the interrupt handling techniques should be suitable for writing at least a portion of the interrupt processing code in a high level language since writing code in a high level language facilitates development and maintenance of computer systems.

SUMMARY OF THE INVENTION

The present invention provides interrupt handling techniques which, in some embodiments, allow obtaining a short interrupt latency and a short register restoration time. These techniques are suitable in some embodiments for writing an interrupt processing code in a high level language.

The above and other advantages are achieved in some embodiments by reserving a number of general purpose registers for code executed with interrupts disabled. Thus, an interrupt handler executing with interrupts disabled may use the reserved general purpose registers without saving them.

If an interrupt handler uses any non-reserved general purpose registers, the interrupt handler saves the non-reserved registers in the reserved registers rather than in the memory. Since register access is typically faster than memory access, the interrupt latency is improved. The register restoration time is also improved because restoring the non-reserved registers from the reserved registers is faster than restoring from the memory.

The invention is suitable in some embodiments for writing interrupt processing code in a high level language. If the high level language compiler generates code which uses non-reserved registers, the interrupt handler, before invoking the interrupt processing code, saves the non-reserved registers in the reserved registers.

Other features and advantages of the invention are described below. The invention is defined by the appended claims.

BRIEF DESCRIPTION OF THE DRAWINGS

FIG. 2A and 2B is an assembly language macro for installing an interrupt handler according to the present invention.

DESCRIPTION OF THE PREFERRED EMBODIMENTS

Figure 1:
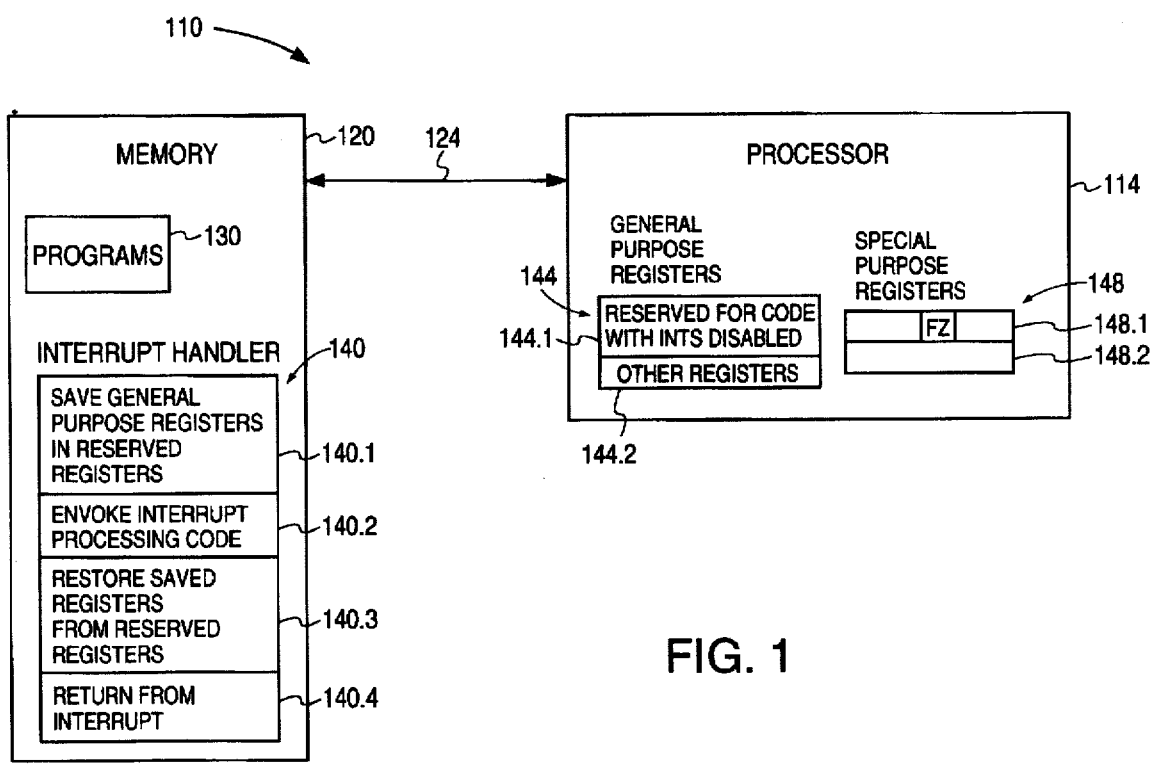
FIG. 1 is a block diagram of a computer system according to the present invention.

FIG. 1 illustrates a computer system 110 providing a short interrupt latency and a short register restoration time. Processor 114 and memory 120 are connected by interface 124. In some embodiments, interface 124 is a collection of conductors connecting the respective address, data and control ports of the processor and the memory. In other embodiments, interface 124 includes a memory controller, address latches, data buffers, and/or other circuitry as is known in the art.

Processor 114 and memory 120 are formed of discrete components or are embedded into an integrated circuit. In some embodiments, processor 114 is a RISC microprocessor of type Am29000 (trademark), Am29050 (trademark), or some other processor of the 29K (trademark) family, which processors are available from Advanced Micro Devices, Inc. of Sunnyvale, Calif.

Memory 120 stores software which includes programs 130 and interrupt handler 140. The software is executed by processor 114.

Processor 114 includes general purpose registers 144 and special purpose registers 148. Processor 114 can perform arithmetic and/or logical operations directly on the contents of general purpose registers 144.

Special purpose registers 148 provide controls and data for certain processor functions. In a processor of type Am29050 the special purpose registers include, for example, the ALU Status Register which contains information about the outcome of some arithmetic and logical operations. Registers 148 include also the Current Processor Status Register 148.1 which contains control information associated with the currently executed process. See *Am29050 Microprocessor User—s Manual*, Advanced Micro Devices, Inc., 1991 which is hereby incorporated herein by reference. See also *RISC Design-Made-Easy$^{SM}$ Application Guide*, Advanced Micro Devices, Inc., 1992 which is also hereby incorporated herein by reference.

Processor 114 does not perform arithmetic and logical operations directly on registers 148. These registers are accessed by data movement only. For example, a special purpose register can be written from a general purpose register 144.

In processors of type Am29050, the processor hardware does not save special purpose registers 148 when an interrupt occurs. The hardware, however, freezes the special purpose registers by setting the FZ (Freeze) bit in Current Processor Status Register 148.1. If an interrupt handler uses any special purpose registers, the interrupt handler saves the contents of such registers before resetting the FZ bit.

Some interrupt handlers do not use any special purpose registers 148, and these handlers can be executed entirely in Freeze mode (that is, with the FZ bit set). These handlers do not save any special purpose registers improving the interrupt latency and the register restoration time.

Many interrupt handlers use one or more general purpose registers 144. If these registers are used by the interrupted program, their contents need to be saved by the interrupt handler.

To improve the interrupt latency and the register restoration time, computer system 110 reserves one or more general purpose registers 144.1 for exclusive use by software running with interrupts disabled. This is practical for processors having a large number of general purpose registers, including processors of type Am29050 which have 192 general purpose registers. See *Am29050 Microprocessor User—s Manual*, supra. Many interrupt handlers run with interrupts disabled, and such interrupt handlers can use the reserved registers 144.1 without saving them. Interrupt latency is improved as a result. The register restoration time is reduced to zero if the interrupt handler uses only the reserved registers.

In some embodiments using a processor of type Am29050, registers 144.1 are 17 general purpose registers GR64 through GR80.

If the interrupt processing code is written in a high level language, for example, in C, the interrupt processing code will use whatever registers are allocated by the high level language compiler. If the compiler allocates non-reserved registers 144.2, then the interrupt handler saves the allocated non-reserved registers in registers 144.1 before invoking the interrupt processing code. The saved registers are restored from registers 144.1 after the interrupt processing code is executed. Saving the registers in the reserved registers 144.1 rather than in the memory improves the interrupt latency and the register restoration time.

Figure 2B:

FIG. 1 includes a block diagram of interrupt handler 140 which saves registers 144.2 in registers 144.1. FIG. 2 illustrates an Am29050 assembly language macro installing the interrupt handler 140. Appendix A illustrates a C language interrupt processing code invoked by interrupt handler 140.

At step 140.1, interrupt handler 140 saves registers 144.2 that are used by the interrupt processing code. Registers 144.1 are registers GR64 through GR80 of a processor of type Am29050. Registers 144.2 are Am29050 registers GR1 and GR81 through GR255. Registers GR1 and GR81 through GR95 are reserved for special uses, mostly by the operating system. See *RISC Design-Made-Easy*, supra, page 1. The system compilers by design generate code which uses only the general purpose registers GR96 through GR255.

The compilers start register allocation for the generated code from register GR96 and proceed in the order of register numbers—GR96, GR97, and so on.

At step 140.1, the interrupt handler saves registers GR96 through GR111 in the respective registers GR65 through GR80. The interrupt handler saves in register GR64 the register LR0 which is one of registers GR128 through GR255. The register number of register LR0 is determined by register GR1 as described in *Am29050 Microprocessor User's Manual*, supra, §7.1.1.3.

If the compiler generated code does not use all the registers GR96-111, the interrupt handler in some cases does not save all these registers as explained below. If the compiler generated code uses general purpose registers other than GR96-111, these registers are saved in memory 120. The code for saving the registers in memory is not shown.

Before installing the interrupt handler, one determines which general purpose registers are used in the compiler generated code. This determination is made by examining the generated code assembly language listing produced by the compiler. The listing for the interrupt processing code of Appendix A is shown in Appendix B. The Appendix B listing shows only the registers GR98, GR97 and GR96.

Once the general purpose registers used by the generated code are determined, an entry point into the interrupt handler is set as follows. Each "add" instruction at step 140.1 (FIG. 2A) is a move instruction saving one of registers GR111 through GR97, LR0, GR96 (in that order). The entry point is set so as not to save registers with numbers higher than the largest number of a register used in the generated code. Thus for Appendix A, the entry point is set at the instruction "add gr67,gr98,0" to save only the registers GR98, GR97, GR96 and LR0. The entry point is set by the "nregs" parameter to the macro of FIG. 2A and FIB. 2B (nregs=3 in Appendix A—see the last statement of Appendix A.)

The macro is then invoked to install the interrupt handler.

The last instruction at step 140.1 is "add gr65,gr96,0". While this "add" instruction appears after the instruction "calli" in FIG. 2A and 2B, this "add" instruction is executed before the completion of "calli". In processors of type Am29050, the instruction following the "calli" instruction is executed before the completion of the "calli" instruction.

Once the registers have been saved, the C language interrupt processing code is invoked at step 140.2 by calling the routine identified by the macro parameter "C_handler". The interrupt processing code runs with interrupts disabled.

Then, at step 140.3, the saved registers 144.2 are restored from registers 144.1. The first instruction—"jmp"—at step 140.3 transfers control to an "add" instruction in the register restoration code so as to restore only those registers which have been saved at step 140.1.

At step 140.4, a return is made from the interrupt handler.

The above interrupt processing technique allows writing interrupt processing code in a high level language thereby facilitating the software development and maintenance.

While the invention has been illustrated with respect to the embodiments described above, other embodiments and variations are within the scope of the invention. In particular, the invention is not limited by a type of processor or by any particular computer language. In some embodiments, one or more of registers 144.1 are non-general-purpose registers. Other embodiments and variations are within the scope of the invention as defined by the following claims.

APPENDIX A

```
include <signal.h> define interrupt_cache(trap_number, C_handler, nregs) \
    __ASM(" interrupt_cache "#trap_number","#C_handler","#nregs")

void handler( )
{
    static   int count;
    static   volatile char *device_adds=(char*)0x10000;
    char     tmp;

tmps=*device_adds;      /* read from interrupting device */
    count=count+1;          /* increament interrupt count */
} main(argc,argv)
int     argc;
char    *argv[ ];
{
    __ASM(" .include \"interrupt.h\"");

/* Make association between interrupt and handler function */
    interrupt_cache(13, handler, 3);
}
```

APPENDIX B

```
        .file     "demo.c"
;    High C hc2.3V
        .cputype    29000
        .ident "hc2.3V -O2 -Ms -29000 -bw demo.c\n"

.text
L00.text:
        .lcomm  L00.bss,0
        .lcomm  L1.count,4

.data
L00.data:
        .align
L2.device_adds: .word   65536   ; 0x10000

.text
;------------| handler |--------------------
; Codegen note: In-coming parameters start at 1r2
;1      #include <signal.h>
;2      |
;3      |#define interrupt_cache(trap_number, C_handler, nregs) \
;4      |   __ASM(" interrupt_cache "#trap_number",
;5      |   "#C_handler","#nregs)
;6      |
;7      |void handler ( )
;8      |{
        .word  0x20000 ; Tag: argcnt=0 msize=0

.global   _handler
_handler:
;9      | static    int count;
;10     | static    volatile char *device_adds=(char*)0x10000;
;11     | char      tmp;
;12     |
;13     | tmp=*device_adds;           /* read from interrupting device */
        const    gr96,L00.bss     ⎫
        consth   gr96,L00.bss     ⎬  READ count
        load     0,0,gr97,gr96    ⎭
        const    gr98,L00.data    ⎫
        consth   gr98,L00.data    ⎬  get device-adds
        load     0,0,gr98,gr98    ⎭ add      gr97, gr97 1     ⎤  update count
        store    0, 0, gr97, gr96 ⎦  ; Delay-1
        load     0, 1, gr96, gr98    ; Delay=2-READ device-adds
                                     /* increament interrupt count */
;14     | count=count+1;              /* increament interrupt count */
;15     |}
```

APPENDIX B-continued

```
        jmpi    1r0
        nop
;------------| main |--------------------
; Codegen note: In-coming parameters start at 1r2
;16     |
;17     |main(argc,argv)
;18     |int       argc;
;19     |char      argv[ ];
;20     |{
        .word    0x40000 ; Tag: argcnt=2 msize=0

.global   _main
_main:
;21     | __ASM(" .include \"interrupt.h\"");
        .include "interrupt.h"

;22     |
;23     | /* Make association between interrupt and handler function */
;24     | interrupt_cache(13, handler, 3);
        interrupt_cache 13,handler,3

;25     |}
        jmpi    1r0
        nop
;26     |
;27     |
;28     |
```

What is claimed is:

1. A method of handling an interrupt or trap comprising the steps of:

reserving a first register for use by a computer code executed with interrupts disabled;

defining a second register as a general purpose register;

operating a processor that responds to an interrupt or trap by disabling all interrupts in response to the interrupt or trap;

receiving an interrupt or trap;

responsive to the step of receiving an interrupt or trap and operating while all interrupts are disabled by the processor, executing an interrupt or trap processing code which includes instructions overwriting the second register; and previous to the executing step, saving data from the second register into the first register, the second register being subsequently subject to overwriting by the interrupt or trap processing code in the first register.

2. A method according to claim 1 wherein the interrupt or trap processing code is written in a high level language.

3. A method according to claim 1 wherein the interrupt or trap processing code is written in an assembler language.

4. A method according to claim 1 further comprising, after executing the step of executing an interrupt or trap processing code, the step of restoring the second register from the first register.

5. A method according to claim 1 wherein the step of operating a processor further includes the step of operating a RISC-type processor having a large number of general purpose registers.

6. A computer system comprising:

a processor that responds to an interrupt or trap by disabling all interrupts in response to the interrupt or trap, the processor including:

a first register reserved for use by a computer code executed with interrupts disabled;

a second register;

an instruction memory coupled to the processor including:

a memory storing an interrupt or trap handling software that executes an interrupt or trap processing code including instructions for overwriting the second register;

a memory storing a context switching software that is operative prior to the interrupt or trap processing code and saves data from the second register into the first register, the second register being subsequently subject to overwriting by the interrupt or trap processing code in the first register.

7. A computer system according to claim 6 wherein the interrupt or trap handling software is written in a high level language.

8. A computer system according to claim 6 wherein the interrupt or trap handling software is written in an assembler language.

9. A computer system according to claim 6 wherein the interrupt or trap handling software further includes a code for restoring the saved second register from the first register after executing of the interrupt processing code.

10. A computer system according to claim 6 wherein the second register is a general purpose register.

11. A computer system according to claim 10 wherein the processor is a RISC-type processor having a large number of general purpose registers.

12. A method of handling an interrupt or trap comprising the steps of:

reserving a plurality of first-type registers for use by a computer code executed with interrupts disabled;

defining a plurality of second-type registers as general purpose registers;

operating a processor that responds to an interrupt or trap by disabling all interrupts in response to the interrupt or trap;

receiving an interrupt or trap;

responsive to the step of receiving an interrupt or trap and operating while all interrupts are disabled by the processor, executing an interrupt or trap processing code which includes instructions overwriting a second-type register; and previous to the executing step, saving data from the second-type register into the first-type register, the second-type register being subsequently subject to overwriting by the interrupt or trap processing code in the first-type register.

13. A method according to claim 12 wherein the interrupt or trap processing code is written in a high level language.

14. A method according to claim 12 wherein the interrupt or trap processing code is written in an assembler language.

15. A method according to claim 12 further comprising, subsequent to executing the step of executing an interrupt or trap processing code, the step of restoring the second-type register from the first-type register.

16. A method according to claim 12 wherein the step of operating a processor further includes the step of operating a RISC-type processor having a large number of general purpose registers.

17. A computer system comprising:

a processor that responds to an interrupt or trap by disabling all interrupts in response to the interrupt or trap, the processor including:

a plurality of first-type registers reserved for use by a computer code executed with interrupts disabled;

a plurality of second-type registers;

an instruction memory coupled to the processor including:

a memory storing an interrupt or trap handling software that executes an interrupt or trap processing code including instructions for overwriting a register of the second-type registers;

a memory storing a context switching software that is operative prior to the interrupt or trap processing code and saves data from a register of the second-type registers into a register of the first-type registers, the second-type registers being subsequently subject to overwriting by the interrupt or trap processing code in the first-type registers.

18. A computer system according to claim 17 wherein the interrupt or trap handling software is written in a high level language.

19. A computer system according to claim 17 wherein the interrupt or trap handling software is written in an assembler language.

20. A computer system according to claim 17 wherein the interrupt or trap handling software further includes a code for restoring the saved register of the second-type registers from a register of the first-type registers after executing of the interrupt processing code.

21. A computer system according to claim 17 wherein the second-type registers are general-purpose registers.

22. A computer system according to claim 21 wherein the processor is a RISC-type processor having a large numbers of general purpose registers.

23. A method for handling an interrupt in a computer, the method comprising the steps of:

operating a processor that responds to an interrupt or trap by disabling all interrupts in response to the interrupt or trap, the processor including a first register and a second register;

reserving the first register for use by a computer code executed with interrupts disabled;

receiving an interrupt;

disabling all interrupts in response to the receiving of the interrupt;

transferring a datum stored in the second register into the first register in response to the receiving of the interrupt; and invoking an interrupt processing code with the interrupts disabled, the interrupt processing code including a code for overwriting the second register.

24. A method according to claim 23 wherein the second register is a general purpose register.

25. A method according to claim 23 wherein the interrupt processing code is written in a high level language.

26. A method according to claim 23 wherein the interrupt processing code is written in an assembler language.

27. A method according to claim 23 further comprising a plurality of first-type registers and a plurality of second-type registers.

28. A computer system comprising:

a processor that responds to an interrupt or trap by disabling all interrupts in response to the interrupt, the processor including a first register and a second register;

an instruction memory including:

software which accesses the first register only with interrupts disabled; and an interrupt handler including:

a code which reserves the first register for usage by a computer code executed with interrupts disabled;

a code which transfers a datum stored in the second register into the first register;

a code which disables interrupts; and an interrupt processing operable with the interrupts disabled.

29. A computer system according to claim 28 wherein the interrupt handler further includes:

a code which utilizes the first register.

30. A computer system according to claim 28 wherein the interrupt handler further includes:

a code which restores a datum stored in the first register into the second register.

31. A computer system according to claim 28 wherein the second register is a general purpose register.

32. A computer system according to claim 28 wherein the interrupt processing code is written in a high level language.

33. A computer system according to claim 28 wherein the first register includes a plurality of first register elements and the second register, includes a plurality of second register elements.

34. A computer system according to claim 28 wherein the processor is a RISC-type processor having a large number of general purpose registers.

\* \* \* \* \*